United States Patent
LeBire

(10) Patent No.: US 10,660,326 B2
(45) Date of Patent: May 26, 2020

(54) UNIVERSAL STEADY REST SYSTEM

(71) Applicant: Steven D. LeBire, Massena, NY (US)

(72) Inventor: Steven D. LeBire, Massena, NY (US)

( * ) Notice: Subject to any disclaimer, the term of this patent is extended or adjusted under 35 U.S.C. 154(b) by 0 days.

(21) Appl. No.: 16/540,763

(22) Filed: Aug. 14, 2019

(65) Prior Publication Data

US 2020/0054001 A1   Feb. 20, 2020

Related U.S. Application Data

(60) Provisional application No. 62/718,414, filed on Aug. 14, 2018.

(51) Int. Cl.
    *A01M 31/02* (2006.01)
    *F41A 23/06* (2006.01)
    *F41A 23/14* (2006.01)

(52) U.S. Cl.
    CPC ............. *A01M 31/02* (2013.01); *F41A 23/06* (2013.01); *F41A 23/14* (2013.01)

(58) Field of Classification Search
    CPC ......... A01M 31/02; F41A 23/06; F41A 23/14; F41A 23/12
    See application file for complete search history.

(56) References Cited

U.S. PATENT DOCUMENTS

| | | | | |
|---|---|---|---|---|
| 2,709,818 A | * | 6/1955 | Freese | A47B 23/02 5/507.1 |
| 5,347,740 A | * | 9/1994 | Rather | F41C 27/00 396/426 |
| 5,481,817 A | | 1/1996 | Parker | |
| 5,685,104 A | * | 11/1997 | Breazeale, Jr. | F41A 23/02 248/287.1 |
| 5,933,999 A | | 8/1999 | McClure et al. | |
| 6,058,641 A | * | 5/2000 | Vecqueray | F41A 23/12 248/425 |
| 6,269,578 B1 | * | 8/2001 | Callegari | F41A 23/02 297/172 |
| 6,276,087 B1 | | 8/2001 | Singletary | |
| 6,637,708 B1 | | 10/2003 | Peterson | |
| 6,729,592 B1 | * | 5/2004 | Kurtts | F16M 11/2064 248/183.1 |
| 6,871,440 B2 | | 3/2005 | Highfill et al. | |
| 7,066,365 B2 | | 6/2006 | Brown | |
| 7,536,820 B2 | * | 5/2009 | Wade | F41A 23/34 42/94 |

(Continued)

*Primary Examiner* — Alvin C Chin-Shue
(74) *Attorney, Agent, or Firm* — Dennis B. Danella, Esq.; Woods Oviatt Gilman LLP

(57) ABSTRACT

A firearm steady rest includes a tree stand unit and a universal steady rest unit. The tree stand unit has a tubular stand mount and U-bolts to secure the tree stand unit to a tree stand. A bottom slide is slidably received within the tubular stand mount while a tubular rest mount is pivotally connected to the bottom slide. A stand clamp secures the bottom slide within the tubular stand mount while a rest clamp secures the universal steady rest unit within the tubular rest mount. The universal steady rest unit includes a steady mount having a circular post region proportioned to rotate within the tubular rest mount. A steady rest is pivotally coupled to the steady mount via a pivot plate. A tubular extension member may also be included. The firearm steady rest may fold into a bundle measuring less than 4 inches by 4 inches by 28 inches.

12 Claims, 5 Drawing Sheets

(56) References Cited

U.S. PATENT DOCUMENTS

| | | |
|---|---|---|
| 7,658,140 B2 | 2/2010 | Lombardi |
| 7,770,319 B2 * | 8/2010 | McDonald .............. F41A 23/06 |
| | | 248/281.11 |
| 8,166,695 B2 * | 5/2012 | Pippin ..................... F41A 23/06 |
| | | 224/519 |
| 9,328,860 B1 * | 5/2016 | Hauser ................... F16M 11/06 |
| 9,441,902 B2 | 9/2016 | Noel |
| 2002/0088163 A1 * | 7/2002 | Young ................... A01M 31/02 |
| | | 42/94 |
| 2003/0205599 A1 * | 11/2003 | Brown ...................... B60R 9/06 |
| | | 224/401 |
| 2009/0113779 A1 * | 5/2009 | Shipman ................ F16M 11/10 |
| | | 42/94 |
| 2013/0145671 A1 | 6/2013 | Cavell |

\* cited by examiner

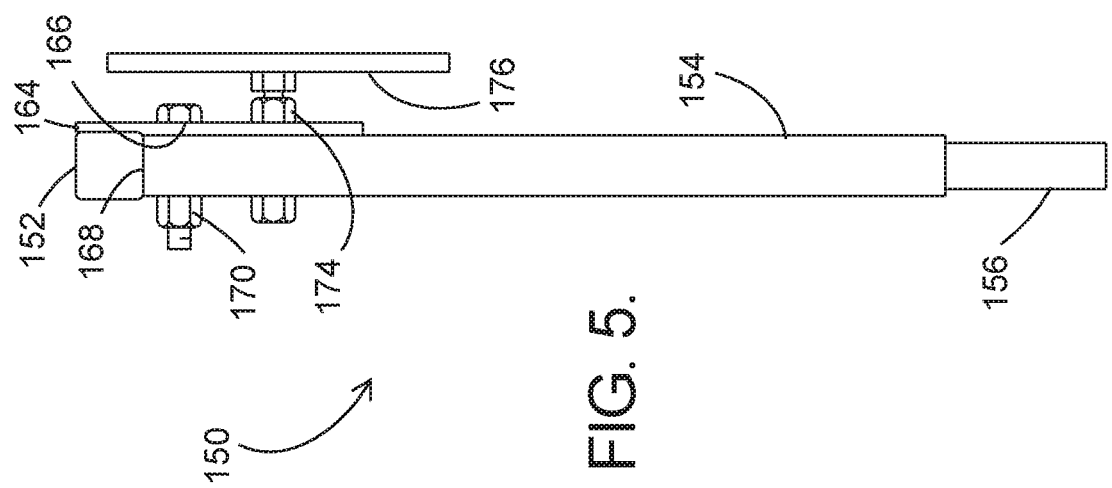
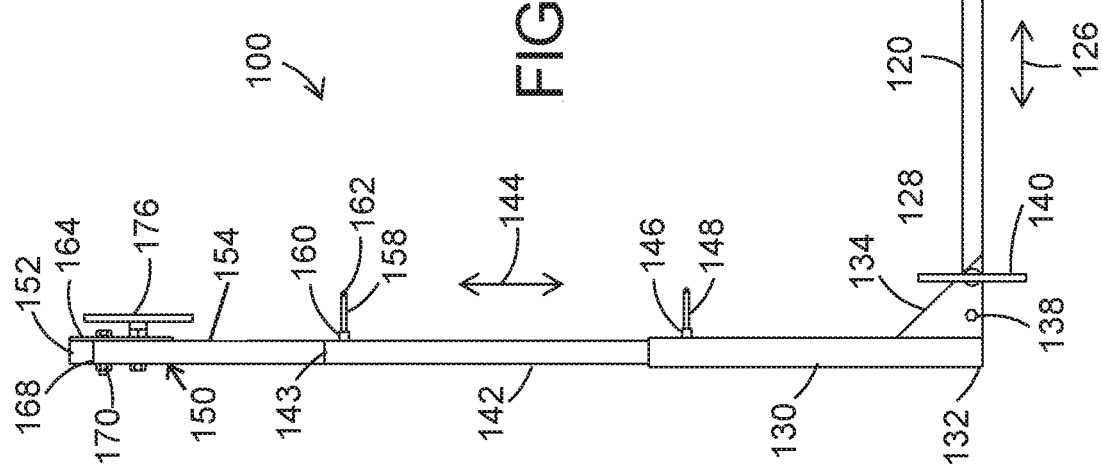

UNIVERSAL STEADY REST SYSTEM

CROSS-REFERENCE TO RELATED APPLICATIONS

This application claims the benefit of U.S. Patent Application No. 62/718,414, filed on Aug. 14, 2018, the contents of which are hereby incorporated by reference in its entirety.

FIELD OF THE INVENTION

The present invention generally relates to hunting equipment, and more particularly to a steady rest system for supporting a rifle, shotgun or crossbow, and still more particularly to a universal steady rest system wherein the steady rest may be quickly and efficiently transferred between multiple system mounts without requiring dismantling or removing of the entire steady rest.

BACKGROUND OF THE INVENTION

Tree stands and ladder stands used by hunters generally include a platform on which to stand and an optional seat. A hunter then typically sits or stands until a target animal is spotted, at which point the hunter raises his or her firearm, such as a rifle, shotgun or crossbow to aim and fire at the target. To assist the hunter, certain stands include a steady rest upon which the hunter can rest the gun barrel or crossbow when aiming or firing. The extra support afforded by the steady rest can improve accuracy while also allowing a hunter to extend his or her shooting range.

While traditional steady rests are available, these rests suffer a number of significant drawbacks. For instance and without limitation, prior art steady rests are cumbersome and heavy, making their deployment difficult and frustrating. That is, the hunter must carry the stand with steady rest into the field or forest to the location of choice. A tow rope is then used to pull the stand and rest up the tree where the stand can be mounted onto the tree. The cumbersome stand and rest make are difficult to raise up the tree as their bulk entangles with or otherwise interferes with tree branches, limbs and leaves. Additionally, these steady rests are fixed members mounted to the stand. As a result, adjustment and optimization are not possible. Rather, the hunter must "make do" with the location of the steady rest and attempt to use the rest to the best advantage possible.

Thus, there is a need for a universal steady rest system that can be attached to all tree stands, hang-on ladder stands and climbers, as well as ground-based pedestals. There is a further need for a compact, universal steady rest system wherein the steady rest can be quickly and easily removed and reinstalled from a universal mount, thereby allowing a single steady rest to be used on any number of mounts/stands. The present invention addresses these, and other, needs.

BRIEF SUMMARY OF THE INVENTION

It is, therefore, an aspect of the present invention to provide a firearm steady rest system comprising a tree stand unit, pedestal unit and universal steady rest unit. The tree stand unit comprises a tubular stand mount configured to secure the tree stand unit to a portion of a tree stand; a bottom slide dimensioned to be slidably received within the tubular stand mount, wherein a distal end of the bottom slide is configured to extend outwardly of the tree stand when the tree stand unit is secured to the tree stand; and a tubular rest mount having a first end and a second end, wherein the first end of the tubular rest mount is pivotally connected to the distal end of the bottom slide, wherein the tubular rest mount is configured to extend perpendicular to the bottom slide when the tree stand unit is secured to the tree stand. The pedestal unit comprises a tubular pedestal mount having a first end and an opposing second end; a plurality of tubular pedestal leg mounts, each pivotally connected to the tubular pedestal mount proximate to the first end; a plurality of pedestal legs, a respective pedestal leg dimensioned to be slidably received within a respective tubular pedestal leg mount; and a plurality of leg clamps, a respective leg clamp mounted on a respective tubular pedestal let mount and configured to releasably secure the respective pedestal leg within the respective tubular pedestal leg mount. The universal steady rest unit comprises a steady mount having a first end and an opposing second end, wherein the first end includes a post region having a circular cross section wherein the post region is dimensioned to be selectively rotatably received within the second end of the tubular rest mount and the second end of the tubular pedestal mount; and a steady rest pivotally coupled to the second end of the steady mount.

In a further aspect of the present invention, the system further comprises a tubular extension member dimensioned to be slidably received within the tubular rest mount of the tree stand unit and the tubular pedestal mount of the pedestal unit, and wherein the post region of the steady mount is dimensioned to be selectively rotatably received within the tubular extension member.

In still another aspect of the present invention, the tree stand unit includes one or more U-bolts configured to secure the tree stand unit to the portion of the tree stand. The tree stand unit may also include an adaptor configured to rest atop the tubular stand mount and below a mesh floor of the tree stand when secured by one of the one or more U-bolts. The tree stand mount may also include a stand clamp to selectively position and secure the bottom slide within the tubular stand mount. The stand clamp may include a threaded aperture located on the tubular stand mount and a corresponding threaded member threadably received within the threaded aperture. The tubular rest mount may also include a rest clamp to selectively position and secure the universal steady rest unit within the tubular rest mount. The rest clamp also includes a threaded aperture located on the tubular rest mount and a corresponding threaded member threadably received within the threaded aperture.

In a further aspect of the present invention, the steady rest may include a pivot plate fixedly mounted thereon, wherein the pivot plate is selectively coupled to the second end of the steady mount. The steady rest may also include a threaded aperture wherein the pivot plate defines an arcuate aperture configured to coincide with the steady rest threaded aperture. A corresponding threaded member may pass through the arcuate aperture and be threadably received within the steady rest threaded aperture to secure the pivot plate and steady rest to the steady mount at a user-selected angle relative to the steady mount.

In still another aspect of the present invention, the tree stand unit and universal steady rest unit may be configured to fold into a compact bundle measuring, for example, less than about 4 inches wide by about 4 inches high by about 28 inches long. The tubular stand mount, bottom slide, tubular rest mount, tubular pedestal mount, tubular pedestal leg mounts, pedestal legs steady mount, with the exception of the post region, and the steady rest may also each have a square cross section.

In a further aspect of the present invention, a firearm steady rest comprises a tree stand unit, a universal steady rest unit and a tubular extension member. The tree stand unit comprises a tubular stand mount configured to secure the tree stand unit to a portion of a tree stand; a bottom slide dimensioned to be slidably received within the tubular stand mount, wherein a distal end of the bottom slide is configured to extend outwardly of the tree stand when the tree stand unit is secured to the tree stand; a tubular rest mount having a first end and a second end, wherein the first end of the tubular rest mount is pivotally connected to the distal end of the bottom slide, wherein the tubular rest mount is configured to extend perpendicular to the bottom slide when the tree stand unit is secured to the tree stand; one or more U-bolts configured to secure the tree stand unit to the portion of the tree stand; a stand clamp to selectively position and secure the bottom slide within the tubular stand mount, wherein the stand clamp includes a threaded aperture located on the tubular stand mount and a corresponding threaded member threadably received within the threaded aperture; and a rest clamp to selectively position and secure the universal steady rest unit within the tubular rest mount, the rest clamp includes a threaded aperture located on the tubular rest mount and a corresponding threaded member threadably received within the threaded aperture.

The universal steady rest unit may comprise a steady mount having a first end and an opposing second end, wherein the first end includes a post region having a circular cross section wherein the post region is dimensioned to be selectively rotatably received within the second end of the tubular rest mount; a steady rest pivotally coupled to the second end of the steady mount; and a pivot plate fixedly mounted on the steady rest, wherein the pivot plate is selectively coupled to the second end of the steady mount, wherein the steady rest includes a threaded aperture and wherein the pivot plate defines an arcuate aperture configured to coincide with the steady rest threaded aperture, and wherein a corresponding threaded member passes through the arcuate aperture and is threadably received within the steady rest threaded aperture to secure the pivot plate and steady rest to the steady mount at a user-selected angle relative to the steady mount.

The tubular extension member may be dimensioned to be slidably received within the tubular rest mount of the tree stand unit, and wherein the post region of the steady mount is dimensioned to be selectively rotatably received within the tubular extension member. The tubular stand mount, bottom slide, tubular rest mount, tubular pedestal mount, tubular pedestal leg mounts, pedestal legs steady mount, with the exception of the post region, and the steady rest may each have a square cross section, and the tree stand unit and universal steady rest unit are configured to fold into a compact bundle measuring, for example, less than about 4 inches wide by about 4 inches high by about 28 inches long.

In still another aspect of the present invention, the tree stand unit may also include an adaptor configured to rest atop the tubular stand mount and below a mesh floor of the tree stand when secured by one of the one or more U-bolts.

Additional aspects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein:

FIG. 4 is a side view of the tree stand steady rest unit shown in FIG. 1;

FIG. 5 is a side view of a universal steady rest assembly suitable for use within the firearm steady rest system in accordance with an aspect of the present invention;

DETAILED DESCRIPTION OF THE INVENTION

Figure 1:
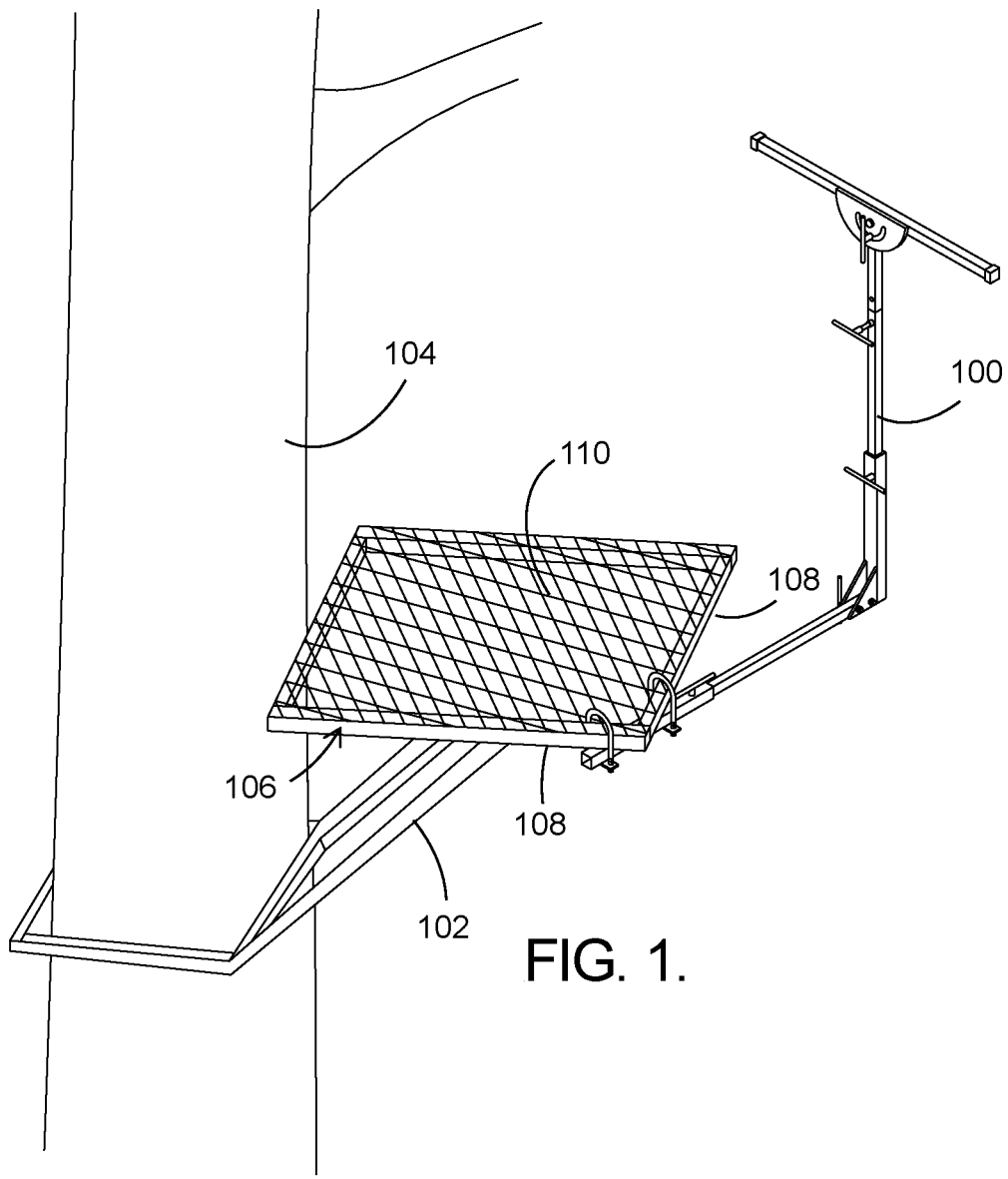
FIG. 1 is an environmental view of a tree stand steady rest unit of a firearm steady rest system in accordance with an aspect of the present invention.

Turning now to the drawings, with reference to FIG. 1, an exemplary embodiment of a tree stand steady rest unit 100 of a firearm steady rest system in accordance with the present invention is shown mounted onto a tree stand 102 which is secured to a tree 104. It should be noted that additional and other components of tree stand 102, such as a seat, ladder, etc. have been omitted and form no part the inventive firearm steady rest system. Typically, tree stand 102 includes a frame 106 comprising a plurality of tubular frame members 108. Frame members 108 may be 1 inch steel or aluminum square tubes. Secured atop frame 106 is a floor 110. Floor 110 is typically a steel mesh to allow the elements (rain and snow) to pass through tree stand 102.

Figure 3:
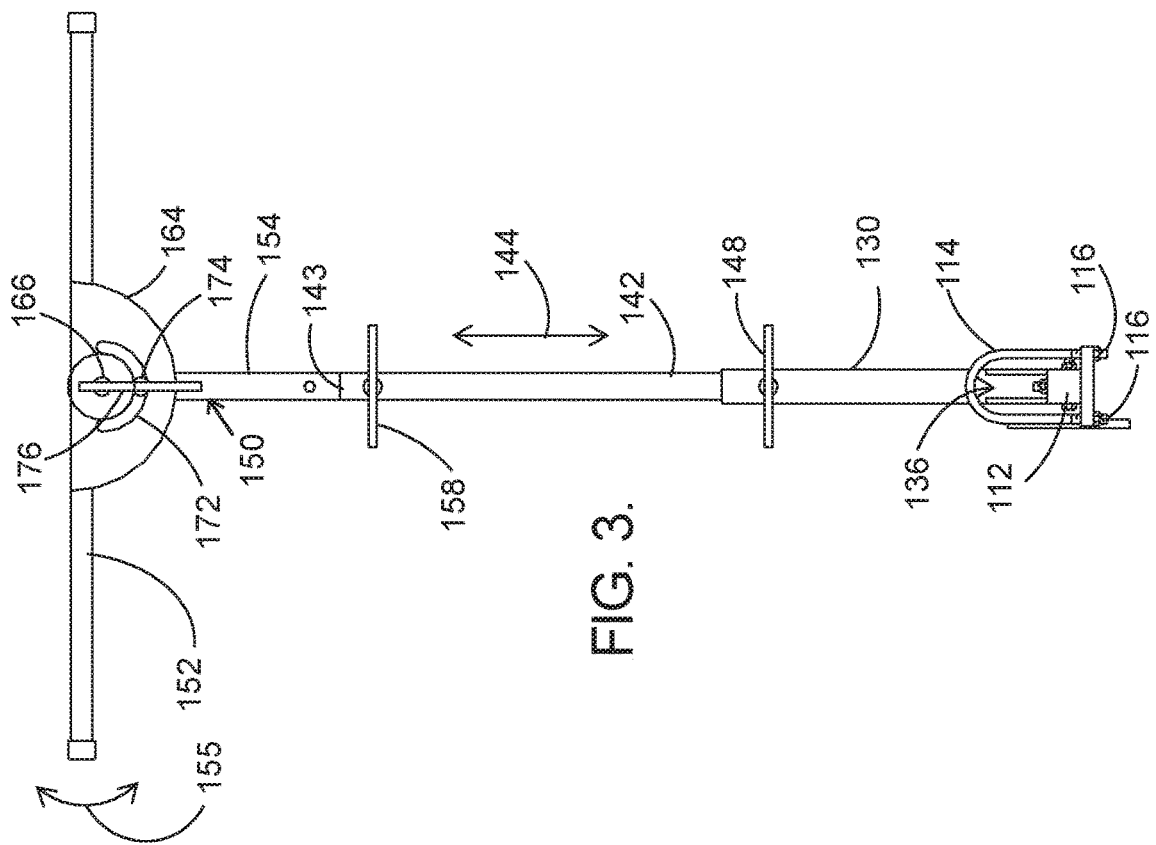
FIG. 3 is a back view of the tree stand steady rest unit shown in FIG. 1.
Figure 2:
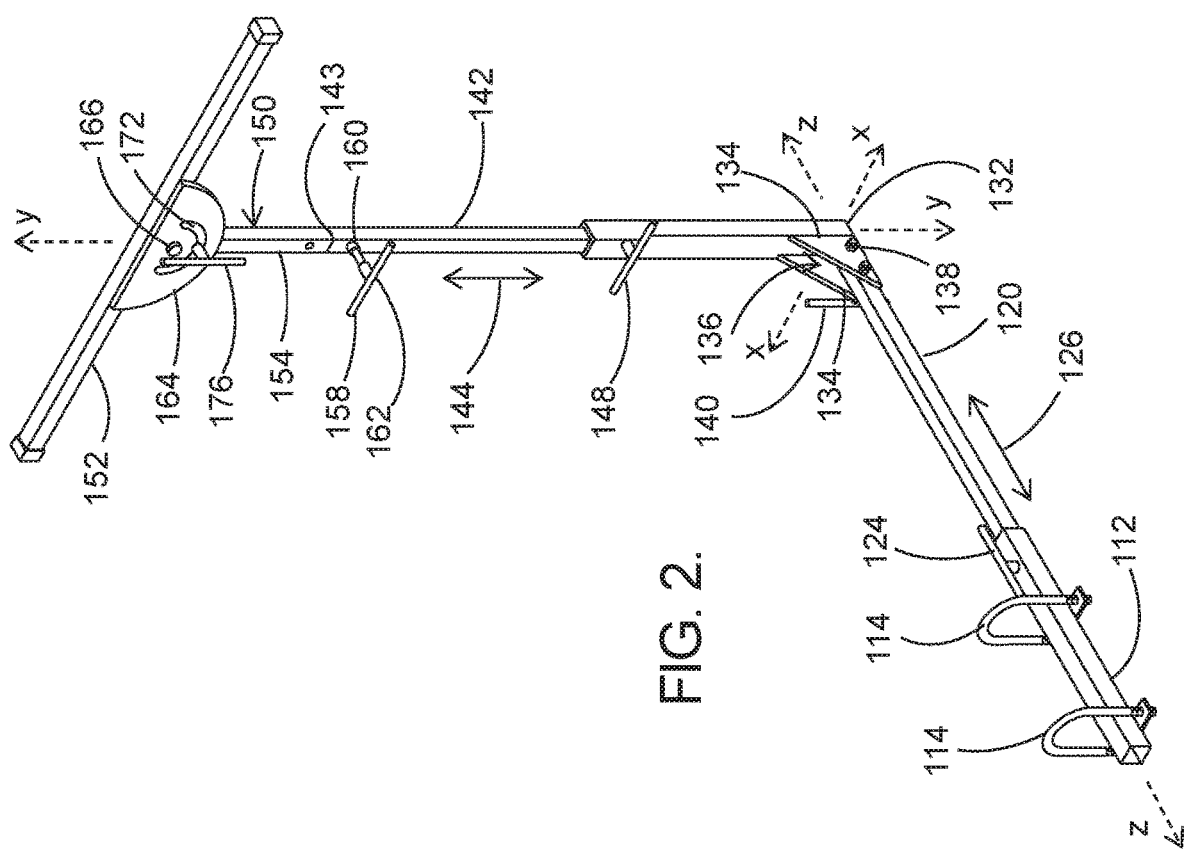
FIG. 2 is a perspective view of the tree stand steady rest unit shown in FIG. 1.

With additional reference to FIGS. 2-4, tree stand steady rest unit 100 includes a tubular stand mount 112 which is configured to be secured to tree stand 102 (for ladder stands with seats that can raised, tubular stand mount 112 may be secured to the ladder stand footrest). For example, and without limitation thereto, tubular stand mount 112 may be secured using one or more U-bolt fasteners 114. Those skilled in the art will recognize that other satisfactory fasteners may be used, and such alternative fasteners are to be considered within the teachings of the present invention. Tubular stand mount 112 may be formed of square tubing, and in one aspect of the present invention may be fabricated of 1 inch square steel tubing having a nominal wall thickness of 0.125 inch. In this manner, stand mount 112 may rest against one or more frame members 108 without rotating. U-bolt fasteners 114 include a pair of nuts 116 to threadably clamp stand mount 112 to frame members 108. As shown in FIG. 4, tree stand steady rest unit 100 may also include an adapter bar 118. Adapter bar 118 may be mounted atop tubular stand mount 112 when U-bolt fastener 114 secures tubular stand mount 112 to floor 110. That is, adapter bar 118 acts a substitute frame member 108 so as to permit sufficient clamping of U-bolt fastener 114 to floor 110 without undue distortion or displacement of the wire mesh.

Bottom slide 120 is dimensioned to be slidably received within tubular stand mount 112 along the z-axis (as indicated by arrow 126). By way of example, bottom slide 120 may be fabricated of 0.75 inch square steel, and may be solid or a hollow tube. To secure bottom slide 120, tubular stand mount 112 may include a nut 122 which receives a bolt 124 therein. In one aspect of the present invention, with bottom slide positioned within tubular stand mount 112, bolt 124 is tightened within nut 122 to impact upon bottom slide 120 to secure bottom slide within mount 112. Alternatively, bottom slide 120 may include corresponding through-holes drilled therethrough whereby bolt 124 may be threadably received within nut 122 and pass through bottom slide 120 so as to prevent unwanted translation along the z-axis. In one aspect of the present invention, bottom slide 120 may include a series of longitudinally spaced through-holes such that bottom slide 120 may translate along the z-axis (arrow 126) so that the distance of distal end 128 of bottom slide 120 from tree stand 102 may be adjusted as desired.

Distal end 128 of bottom slide 120 is pivotally connected to tubular rest mount 130. In one aspect of the present invention, bottom end 132 of tubular rest mount 130 includes a pair of spaced apart flanges 134 defining a channel 136 therebetween. By way of example, tubular rest mount 130 may be fabricated of a 1 inch tubular steel or aluminum tube having a wall thickness of 0.125 inch. Each of flanges 134 may also have a thickness of 0.125 and be located flush with the face of one wall of tubular rest mount 130. As a result, channel 136 will have a nominal width of about 0.75 inch so as to snuggly receive bottom slide 120 therein. To enable pivoting, each of flanges 134 and bottom slide 120 may include a corresponding through bore configured to receive a pivot pin 138 therein. One non-limiting example of a pivot pin 138 may be a bolt and lock nut pair. When tree stand 102 is mounted on tree 104, tubular rest mount 130 is configured to extend perpendicularly to bottom slide 120. To lock rest mount 130 relative to bottom slide 120 to prevent pivoting about pivot pin 138, each of flanges 134 and bottom slide 120 may further include a second corresponding through bore configured to receive a locking pin 140 therein. Locking pin 140 may include a second bolt and nut pair.

Tubular rest mount 130 also defines a hollow center adapted to slidably receive tubular extension member 142 along the y-axis (as indicated by arrow 144). By way of example, tubular extension member 142 may be 0.75 inch square tubular steel. Vertical adjustment of tubular extension 142 may be controlled by a nut 146 which receives a bolt 148 therein. In one aspect of the present invention, with tubular extension member 142 positioned within tubular rest mount 130, bolt 148 is tightened within nut 146 to impact upon tubular extension member 142 120 to secure tubular extension member 142 within rest mount 130. Alternatively, tubular extension member 142 may include corresponding through-holes drilled therethrough whereby bolt 148 may be threadably received within nut 146 and pass through tubular extension member 142 so as to prevent unwanted translation along the y-axis. In one aspect of the present invention, tubular extension member 142 may include a series of longitudinally spaced through-holes such that tubular extension member 142 may translate along the y-axis (arrow 144) as desired.

With additional reference to FIG. 5, universal steady rest assembly 150 generally includes a steady rest 152 pivotally coupled to a steady mount 154. Steady mount 154 is configured to mount to top end 143 of tubular extension member 142, such as via a post region 156.

In accordance with one aspect of the present invention, post region 156 may have a circular cross section dimensioned to be selectively rotatably received within top end 143 of tubular rest mount 130. By way of example and without limitation thereto, as described above, tubular extension member 142 may be fabricated from 0.75 inch square steel having a wall thickness of 0.125 inch. As a result, the open center of the tube has a length of about 0.5 inch. Accordingly, post region 156 may comprise a 0.5 inch diameter circular rod while the remainder of steady mount comprises 0.75 inch square steel. As a result, steady mount 154 (and steady rest 152) may freely rotate about the y-axis (as indicated generally by arrows 155) depending upon user preference or need. To impede rotation, tubular extension member 142 may include a locking member 158 proximate top end 143 such that the locking member 158 engages post region 156. By way of example and without limitation thereto, locking member 158 may include a threaded nut 160 secured to tubular extension member 142 wherein the threaded nut communicates with a corresponding hole within tubular extension member 142. A bolt 162 may then be threadably received within nut 160 until bolt 162 engages post region 156 so as to lock post region 156 within tubular extension member 142 and prevent unwanted rotation.

Steady rest 152 includes a pivot plate 164 fixedly secured thereto. Pivot plate 164 may be generally semi-circular in shape and include a first aperture 166. Aperture 166 coincides with a corresponding through-bore defined within steady mount 154 proximate top end 168 thereof. A pivot pin, such as nut and bolt pair 170 pivotally couples pivot plate 164 (and steady rest 152) to steady mount 154. Pivot plate 164 further defines an arcuate aperture 172 which is configured to coincide with a corresponding threaded aperture 174 on steady mount 154. In accordance with an aspect of the present invention, threaded aperture 174 may be defined by one or more nuts welded onto the tubular wall of steady mount 154. A threaded member, such as T-bolt 176 is configured to pass through arcuate aperture 172 so as to be threadably received within threaded aperture 174. Tightening of T-bolt 176 operates to prevent free pivoting of pivot plate 164 (and steady rest 152) about pivot pin 170. Accordingly, a user may selectively position steady rest 152 at any angle relative to steady mount 154. Thus, should tree stand steady rest unit 100 be mounted to tree stand 102 at an angle, steady rest 152 may be pivoted so as to present a horizontal surface on which to rest the firearm. As a result, a user's aim improves while also preventing unwanted slipping of the firearm during aiming and firing.

Figure 6:
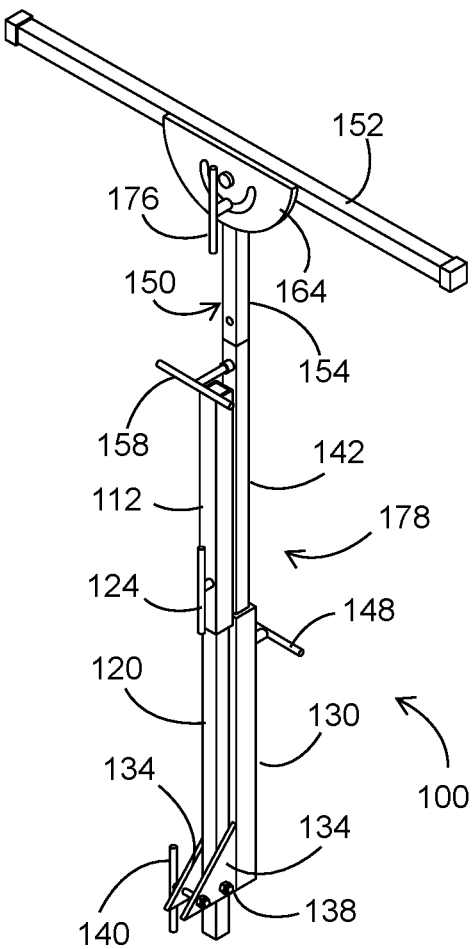
FIG. 6 is a perspective view of the tree stand steady rest shown in FIG. 1 with the steady rest partially collapsed.
Figure 7:
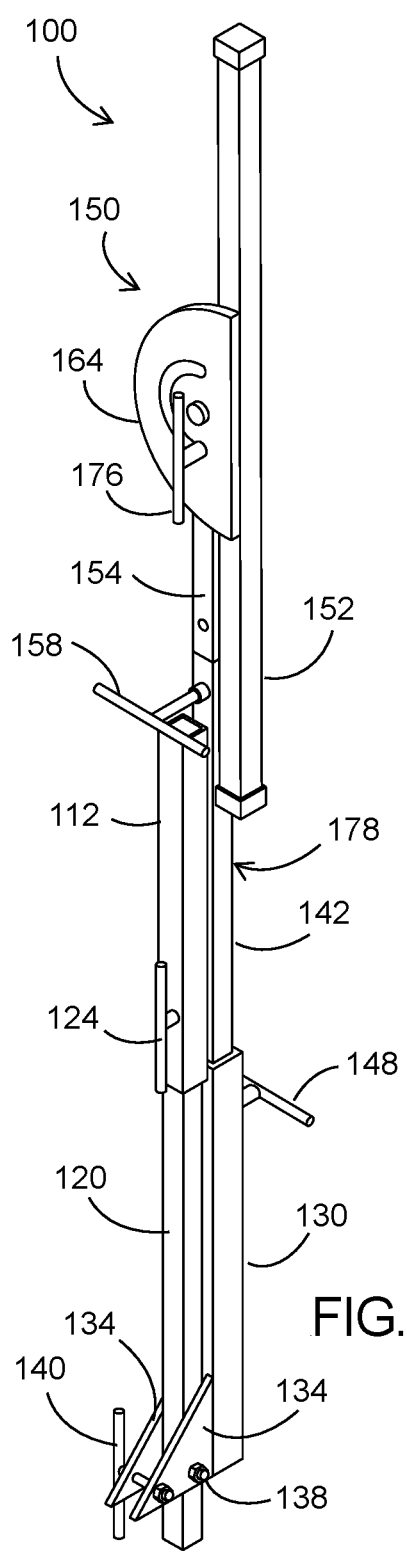
FIG. 7 is a perspective view of the tree stand steady rest shown in FIG. 1 with the steady rest fully collapsed.

With reference to FIGS. 6 and 7, in accordance with an aspect of the present invention, tree stand steady rest unit 100 is configured to fold into a compact bundle 178. In another aspect, compact bundle may measure less than about 4 inches wide by about 4 inches high by about 28 inches long. Still further, the use of tubular members (i.e., bottom slide 120, tubular rest mount 130, tubular extension member 142, steady rest 152 and steady mount 154) minimizes unit weight such that tree stand steady rest unit 100 weighs less than about 8 pounds. As a result, tree stand steady rest unit 100 is highly portable within the fields and woods, particularly when carried with the other gear typically used by hunters. The compact shape also promotes easy lifting up to the tree stand with minimal risk of interference or entanglement with tree limbs, branches or leaves.

In still another aspect of the present invention, the modular construction of tree stand steady rest unit 100 enables a hunter to quickly and easily relocate steady rest 152 across any number of units. By way of example, a hunter may mount one or more tubular stand mounts 112 on a single or multiple tree stands 102. Depending upon the season, intended target or any other variable, a hunter may select or change which tree stand location he or she wishes to use during a hunting session. As each tree stand 102 has its own tubular stand mount 112 mounted thereon, the hunter need only transport bottom slide 120, rest mount 130, extension member 142 and steady rest assembly 150 (collectively referred to as the interchange unit). Thus, should a hunter wish to relocate to a different tree stand 102, the hunter loosens bolt 124 on bottom slide 120 until bottom slide 120 (along with rest mount 130, extension member 142 and steady rest assembly 150) can be slidably removed from tubular stand mount 112. (It should be noted that the interchange unit may be collapsed to form compact bundle 178 prior to or following removal from tubular stand mount 112). The compact interchange unit can then be easily transported to the desired tree stand 102 wherein bottom slide 120 may be slidably coupled to the tubular stand mount 112 already secured to the alternative tree stand 102. The interchange unit can then be unfolded and adjusted to the satisfaction of the hunter. As recounted above, such adjustment includes translation along and/or rotation about each of the y-axis and z-axis.

Figure 8:
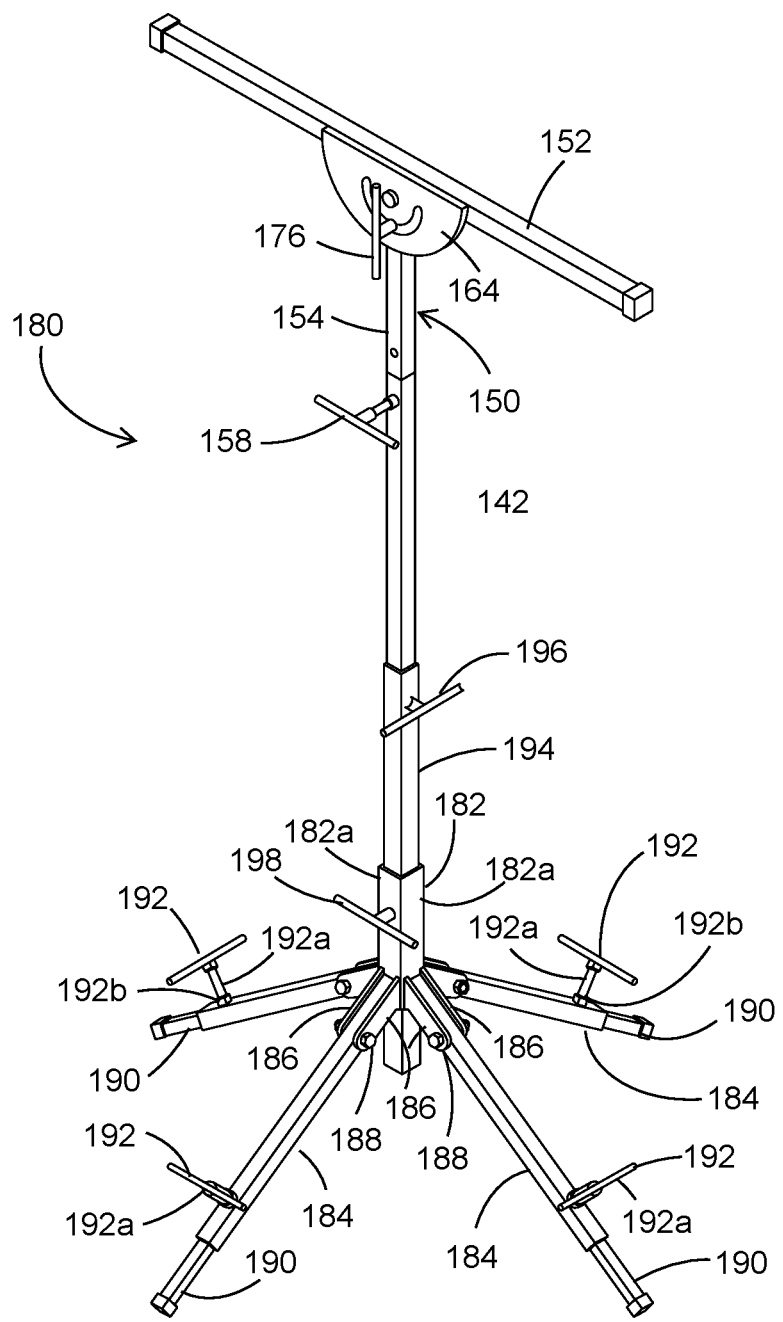
FIG. 8 is a perspective view of a pedestal unit of a firearm steady rest system in accordance with an aspect of the present invention.

Turning now to FIG. 8, in another aspect of the present invention, the firearm steady rest system may further include a pedestal unit 180. Pedestal unit 180 comprises a tubular pedestal mount 182 similar to tubular rest mount 130 described above. That is, in an exemplary embodiment of the present invention, tubular pedestal mount 182 may be fabricated from 1.25 inch square tubing having a 0.125 inch wall thickness. A plurality of tubular pedestal leg mounts 184 are each pivotally coupled to tubular pedestal mount 182. As shown in FIG. 8, tubular pedestal mount 182 may include four leg mounts 184, with one leg mount 184 being positioned on each face 182*a* of the square tubular pedestal mount. To that end, each face 182*a* may include a pair of leg supports 186 positioned and proportioned to receive leg mounts 184 therein. A respective pivot pin, such as a bolt and nut pair 188, is used to pivotally couple the leg mounts 184 to pedestal mount 182. By way of example, each leg mount 184 may be fabricated from 0.75 inch square tubing having a 0.125 inch wall thickness. Each leg mount 184 also slidably receives a respective pedestal leg 190. Leg clamps 192, such as a T-bolt 192*a* threadably received within a nut 192*b*, releasably secures pedestal leg 190 within leg mount 184 and allows for lateral adjustment of pedestal leg 190.

Top end 182*b* of tubular pedestal mount 182 may be configured to receive a pedestal extension 194, which in turn is configured to receive tubular extension member 142 and/or universal steady rest assembly 150. If tubular extension member 142 is slidably mounted within pedestal mount 182, universal steady rest assembly 150 may be slidably mounted within tubular extension member 142 as described above and locked in place with a locking bolt 196. Similarly, tubular extension member 142 may be locked in place within tubular pedestal mount 182 by locking bolt 198. In one aspect of the present invention, pedestal extension 194 and tubular extension member 142 may allow a hunter to adjust the height of steady rest 152 from about 16 inches above the ground to about 86 inches above the ground. Accordingly, tubular extension member 142 and/or universal steady rest assembly 150 may be quickly and efficiently interchanged between tree stand steady rest units 100 and pedestal units 180. Thus, a hunter may utilize a single universal steady rest assembly 150 of the firearm steady rest system for tree stand-based hunting, hunting from a ground blind or for target practice.

It should be noted by those skilled in the art that while the above embodiments have been described as using square tubular member and/or metal members, it is envisioned that tubing having alternative geometries, i.e., round, triangular, hexagonal, octagonal, etc., may be used, as well as alternative materials including, steel, aluminum, carbon fiber, fiberglass and plastics such as but not limited to polymers and composites. Further, while each clamp member has been described as a bolt, those skilled in the art should recognize that any suitable member or mechanism may be used, including but not limited to T-bolts; clamping knobs, toggle clamps, button clips and the like. Additionally, while each pivot pin has been described as a bolt and pin pair, alternative pivot pins may be substituted to equal effect, including but not limited to cotter pins, dowels and the like.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A firearm steady rest system comprising:
   a) a tree stand unit for a tree stand, wherein the tree stand includes a generally horizontally positioned floor having a top support surface and a bottom surface, the tree stand unit comprising:
      i) a tubular stand mount including a first longitudinal axis, wherein the tubular stand mount is configured to secure the tree stand unit to the bottom surface of the generally horizontally positioned floor;
      ii) a bottom slide dimensioned to be slidably received within the tubular stand mount, wherein the entire bottom slide extends along the first longitudinal axis of the tubular stand mount, wherein a distal end of the bottom slide is configured to extend outwardly of the tree stand when the tree stand unit is secured to the tree stand; and
      iii) a tubular rest mount having a first end, a second end, and a second longitudinal axis, wherein the first end of the tubular rest mount is pivotally connected to the distal end of the bottom slide about a first pivot axis that is perpendicular to the first longitudinal axis of the tubular stand mount so that the tubular rest mount is selectively pivoted about the first pivot axis along a plane that includes the first longitudinal axis and the second longitudinal axis, and wherein the tubular rest mount is configured to extend perpendicular to the bottom slide when the tree stand unit is secured to the tree stand;
   b) a pedestal unit comprising:
      i) a tubular pedestal mount having a first end and an opposing second end;
      ii) a plurality of tubular pedestal leg mounts, each pivotally connected to the tubular pedestal mount proximate to the first end;
      iii) a plurality of pedestal legs, a respective pedestal leg dimensioned to be slidably received within a respective tubular pedestal leg mount; and
      iv) a plurality of leg clamps, a respective leg clamp mounted on a respective tubular pedestal leg mount and configured to releasably secure the respective pedestal leg within the respective tubular pedestal leg mount; and c) a universal steady rest unit comprising:
   i) a steady mount having a first end and an opposing second end, wherein the first end includes a post region having a circular cross section, wherein the post region is dimensioned to be selectively rotatably received within the second end of the tubular rest mount and the second end of the tubular pedestal mount;
   ii) an elongated steady rest pivotally coupled to the second end of the steady mount about a second pivot axis, wherein the second pivot axis is perpendicular to the first pivot axis.

2. The system in accordance with claim 1, wherein the system further comprises:
   d) a tubular extension member dimensioned to be slidably received within the tubular rest mount of the tree stand unit and the tubular pedestal mount of the pedestal unit, and wherein the post region of the steady mount is dimensioned to be selectively rotatably received within the tubular extension member.

3. The system in accordance with claim 1, wherein the tree stand unit includes one or more U-bolts configured to secure the tree stand unit to the floor of the tree stand.

4. The system in accordance with claim 3, wherein the tree stand unit includes an adaptor configured to rest atop the tubular stand mount and below the floor of the tree stand when secured by one of the one or more U-bolts.

5. The system in accordance with claim 1, wherein the tree stand mount includes a stand clamp to selectively position and secure the bottom slide within the tubular stand mount.

6. The system in accordance with claim 5, wherein the stand clamp includes a threaded aperture located on the tubular stand mount and a corresponding threaded member threadably received within the threaded aperture.

7. The system in accordance with claim 1, wherein the tubular rest mount includes a rest clamp to selectively position and secure the universal steady rest unit within the tubular rest mount.

8. The system in accordance with claim 7, wherein the rest clamp includes a threaded aperture located on the tubular rest mount and a corresponding threaded member threadably received within the threaded aperture.

9. The system in accordance with claim 1, wherein the steady rest includes a pivot plate fixedly mounted thereon, wherein the pivot plate is selectively coupled to the second end of the steady mount.

10. The system in accordance with claim 9, wherein the steady mount includes a threaded aperture, wherein the pivot plate defines an arcuate aperture configured to coincide with the steady mount threaded aperture, and wherein a corresponding threaded member passes through the arcuate aperture and is threadably received within the steady mount threaded aperture to secure the pivot plate and the steady rest to the steady mount at a user-selected angle relative to the steady mount.

11. The system in accordance with claim 1, wherein the tree stand unit and universal steady rest unit are configured to fold into a compact bundle measuring less than about 4 inches wide by about 4 inches high by about 28 inches long.

12. The system in accordance with claim 1, wherein the tubular stand mount, bottom slide, tubular rest mount, tubular pedestal mount, tubular pedestal leg mounts, pedestal legs steady mount, with the exception of the post region, and the steady rest each have a square cross section.

* * * * *